United States Patent
Podolski et al.

(10) Patent No.: US 10,857,866 B2
(45) Date of Patent: Dec. 8, 2020

(54) SEPARATING DEVICE FOR A STORAGE SPACE OF A CONVERTIBLE VEHICLE AS WELL AS A CONVERTIBLE VEHICLE HAVING SUCH A SEPARATING DEVICE

(71) Applicant: Webasto SE, Stockdorf (DE)

(72) Inventors: Thomas Podolski, Stockdorf (DE); Klaus Obendiek, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 238 days.

(21) Appl. No.: 15/988,049

(22) Filed: May 24, 2018

(65) Prior Publication Data
US 2018/0345770 A1  Dec. 6, 2018

(30) Foreign Application Priority Data

Jun. 2, 2017 (DE) .......... 10 2017 112 209

(51) Int. Cl.
*B60J 7/20* (2006.01)
*B60R 5/04* (2006.01)

(52) U.S. Cl.
CPC ............. *B60J 7/207* (2013.01); *B60R 5/04* (2013.01); *B60R 5/045* (2013.01)

(58) Field of Classification Search
CPC .. B60J 7/202; B60J 7/207; B60R 5/04; B60R 5/045
USPC .................................................. 296/100.12
See application file for complete search history.

(56) References Cited

U.S. PATENT DOCUMENTS

| 4,747,635 A * | 5/1988 | Wagner ............... B60J 7/1204 296/107.12 |
| 6,145,915 A * | 11/2000 | Queveau ............... B60J 7/202 296/107.08 |
| 6,419,308 B1 * | 7/2002 | Corder ............... B60J 7/0084 296/107.08 |
| 7,520,556 B2 * | 4/2009 | Martin ............... B60J 7/0076 296/107.07 |
| 2003/0218346 A1 | 11/2003 | Dintner et al. |

FOREIGN PATENT DOCUMENTS

| DE | 19834850 A1 | 2/2000 |
| DE | 10162303 A1 | 7/2003 |
| DE | 10213553 A1 | 10/2003 |

\* cited by examiner

*Primary Examiner* — Pinel E Romain
(74) *Attorney, Agent, or Firm* — Fitch, Even, Tabin & Flannery, LLP

(57) ABSTRACT

A separating device for a storage space (36) of a convertible vehicle having a top is proposed, which can be displaced between a closed position spanning a vehicle interior and a storage position opening the vehicle interior upward, comprising a separating wall, which divides the storage space into a cargo space and a top receiving space and which can be pivoted around a pivotal axis (A), which extends in the transverse direction of the vehicle, between a horizontal cargo space enlarging position and a vertical receiving space enlarging position. The separating wall is connected to a coupling device, which transmits a displacement movement of a top element to a pivotal movement of the separating wall.

12 Claims, 1 Drawing Sheet

Figure 1:
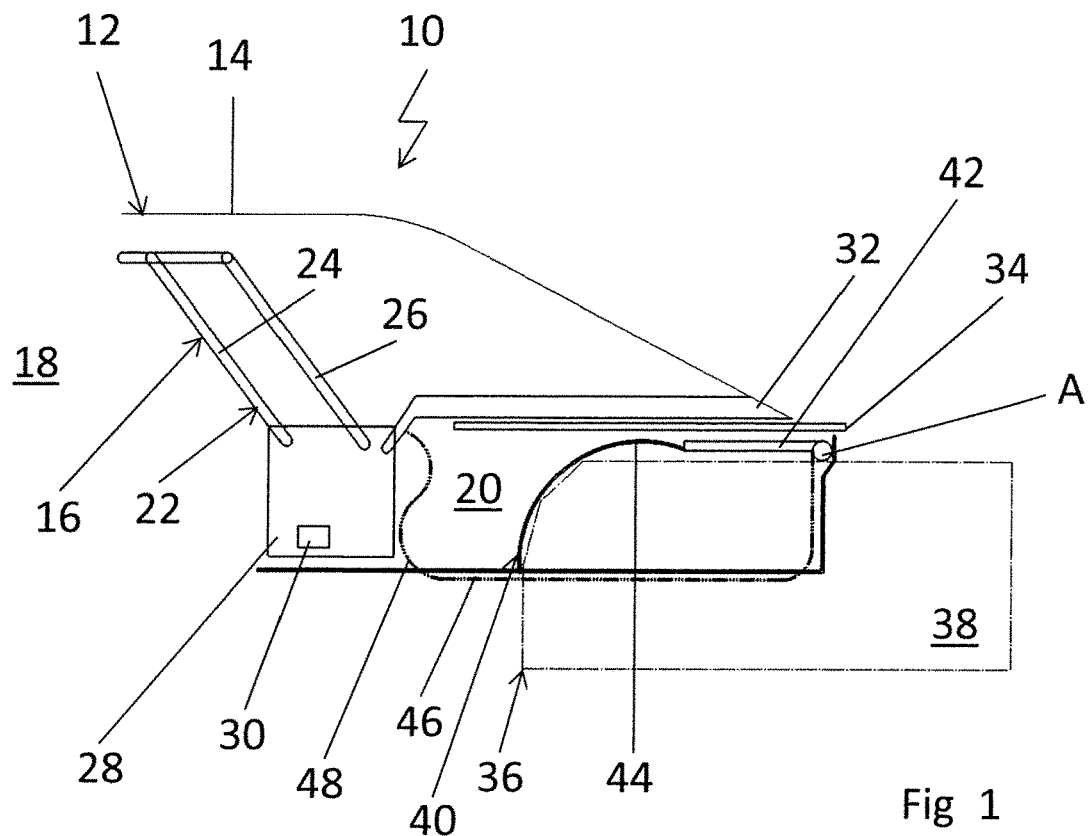

SEPARATING DEVICE FOR A STORAGE SPACE OF A CONVERTIBLE VEHICLE AS WELL AS A CONVERTIBLE VEHICLE HAVING SUCH A SEPARATING DEVICE

CROSS-REFERENCE TO RELATED APPLICATIONS

This application claims priority from German Patent Application 10 2017 112 209.5, filed Jun. 2, 2017, which is hereby incorporated herein by reference in its entirety for all purposes.

FIELD

The invention relates to a separating device for a storage space of a convertible vehicle, comprising the features of the preamble of claim 1.

BACKGROUND

Such a separating device is known from practice and serves for variably configuring a cargo space of a convertible vehicle as a function of the position of a top of the vehicle regarding its size. The separating device, which is arranged in the storage space, divides the storage space into the cargo space and a top receiving space, in which the top is arranged in its storage position. In the closed position of the top, in which it spans a vehicle interior, the top receiving space is not required so that the latter can be used at least partially as a cargo space. The cargo space can therefore be enlarged in the closed position of the top. For this, the separating wall is moved into a horizontal cargo space enlarging position. In the storage position, the separating wall takes up a receiving space enlarging position, in which the cargo space is reduced in size with respect to the state when the top is in the closed position.

The object of the invention is to create a separating device of the make mentioned above, which provides a promoted user comfort with respect to known solutions.

According to the invention, this object is attained by the separating device having the features of claim 1.

The separating device according to the invention therefore comprises a separating wall, which is connected to a coupling device which transmits a displacement movement of a top element to a pivotal movement of the separating wall around a single pivotal axis preferably without translation. The separating wall is driven by the kinematics of the top acting on the separating wall via the coupling device. Thus, a separate drive for the separating wall is not required. It is also not necessary to manually actuate the separating wall since the separating wall is automatically driven by the kinematics for the top.

In a preferred embodiment of the separating device according to the invention, the coupling device comprises at least one pull cable arrangement having one or two cables, at least one tension-resistant and pressure-resistant drive cable and/or at least one deviation lever. In particular a cable pull or a pressure-resistant and tension-resistant drive cable can be integrated into a vehicle design using little space and be adjusted to the requirements in the corresponding vehicle regarding its progression.

In a specific embodiment of the separating device according to the invention, the coupling device is only required for pivoting the separating wall in a pivotal direction. The separating wall can then be pivoted in the other pivotal direction by means of a spring which pre-tensions the separating wall towards the cargo space enlarging position or towards the storage space enlarging position.

Alternatively or additionally thereto, a pull cable arrangement, which forms the coupling device, can comprise two cables, of which one pivots in the respective pivotal position depending on the required pivotal position.

Generally, the separating wall or the coupling device can be actuated by means of any displaceable top element or element of the kinematics of the top. Preferably, the separating wall is actuated at the beginning of the displacement process when displacing the top between the closed position and the storage position. Consequently, the coupling device is preferably connected to a top element which carries out an early displacement movement in the movement progression of the top. Hence, the top element is, for example, in a folding top, a kinematic element for displacing a rearward tensioning bow of the top or the tensioning bow itself, or, in a hard top or rather RHT (retractable hard top), a backlight shell of the top. In a folding top, the rearward tensioning bow is a tensioning element which delimits a foldable top cover at its rearward edge in the closed position of the top and tensions it in the longitudinal direction of the vehicle. In a hard top, a roof shell, which comprises a backlight, i.e. the backlight shell, often carries out the first movement. The coupling device is then connected to a kinematic element of the backlight shell or to the backlight shell itself.

In a preferred embodiment of the separating device according to the invention, a tarp is fastened to an edge of the separating wall facing away from the pivotal axis and is fastened to a storage space bottom by its edge facing away from the separating wall. The tarp prevents the top from being accessible from the cargo space when in its stored state by engaging around the separating wall and protects the cargo space from water, which could drip therein via the top, and from impurities.

In order to impart a defined appearance or to ensure that the cargo space has a defined size in the closed position of the top, the tarp can be made of a resilient material which is pre-tensioned in such a manner that the tarp is curved concavely in the cargo space enlarging position relative to the top receiving space. Additionally, at least one leaf spring can also be integrated into a material of the tarp otherwise free of pretension.

The tarp can also be or comprise a bistable element which is curved convexly in the receiving space enlarging position relative to the top receiving space.

In order to prevent the kinematics of the separating wall and/or the kinematics of the top from being damaged by lifting the separating wall onto an object possibly arranged in the cargo space, a preferred embodiment of the separating device according to the invention comprises an idle arrangement being a safety arrangement. The idle arrangement preferably comprises a spring allocated to the kinematics of the separating wall. Such a spring, for example, is arranged in a bearing arrangement defining the pivotal axis of the separating wall or also is a component of a bowden pull arrangement forming the coupling device. Thus, the separating wall can be decoupled from a top kinematics upon identifying an obstacle in the trajectory of the separating wall.

SUMMARY

In a specific embodiment of the separating device according to the invention, a collision sensor is further provided which is connected to a top control. The collision sensor detects objects in the trajectory of the separating wall and/or the tarp and can interact with the top control in such a manner that the trajectory progression of the top kinematics is halted when an obstacle is identified.

The object of the invention is also a convertible vehicle which comprises a top, which can be displaced between a closed position spanning a vehicle interior and a storage position opening the vehicle interior upward, and a storage space as well as a separating device of the make described above.

Further advantages and advantageous embodiments of the subject matter of the invention can be derived from the description, the drawing and the claims.

An embodiment of a convertible vehicle having a separating device according to the invention is illustrated in the drawings in a schematically simplified manner and is further described in the following description.

BRIEF DESCRIPTIONS OF THE DRAWING

Figure 2:
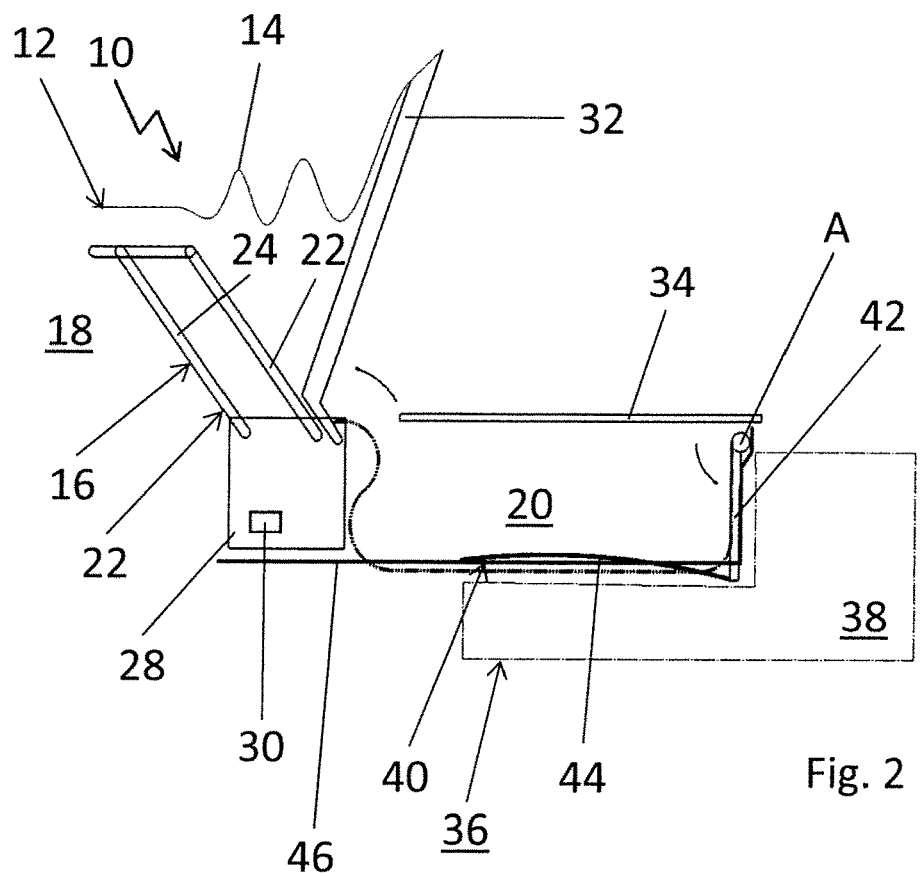

FIG. 1 shows a schematic illustration of a rear area of a convertible vehicle having a separating device in its cargo space enlarging position; and FIG. 2 shows a view corresponding to FIG. 1, though in a storage space enlarging position of the separating device.

DETAILED DESCRIPTION

In the drawing, a vehicle 10 realized as a convertible is illustrated which is provided with a displaceable top 12. In the present instance, the displaceable top 12 is realized as a folding roof and consequently comprises a top cover 14 made of a foldable weatherproof material, which can be displaced between a closed position spanning a vehicle interior 18 and a storage position opening the vehicle interior 18 upward by means of a top linkage 16, said top being received by a rearward top receiving space 20 when in the storage position.

The top linkage 16 comprises a link arrangement 22 having to main links 24 and 26 on each of the top linkage's 16 two sides relative to a longitudinal center plane of the top, said main links 24 and 26 being pivotally mounted on a corresponding main bearing 28 permanently fixed to the vehicle. On the main bearings 28, a main drive is arranged, which is realized as an electric drive or a hydraulic drive and which pivots the link arrangement 22 when actuated correspondingly.

The top linkage 16 comprises a rearward tensioning bow 32 which delimits the top cover 14 at its rearward edge in the closed position of the top 12 and which is also pivotally mounted on the main bearings 28 arranged on both sides. The tensioning bow 32 rests on a top receiving space lid 34 in the closed position of the top (FIG. 1), said top receiving space lid 34 being able to be pivoted and closing the top receiving space 20 upward when in its closed position.

In order to be able to pivot the top receiving space lid 34 to an opening position and to be able to store the top 12 in the top receiving space 20, the tensioning bow 32 is first pivoted upward (cf. FIG. 2). Subsequently, the top receiving space lid 34 can be pivoted upward in the rearward direction, whereupon the top 12 along with the tensioning bow 32 can be stored in the top receiving space 20. Subsequently, the top receiving space lid 34 can be pivoted to its closed position again.

In its rearward area, the vehicle 10 has a storage space 36, which comprises the top receiving space 20 on the one hand and a cargo space 38 accessible from the rear side of the vehicle 10 on the other hand. The cargo space 38 is divided from the top receiving space 20 via a separating device 40. The separating device 40 is variably formed so that the cargo space 38 can be reduced in size (FIG. 2) or enlarged (FIG. 1) as a function of the position of the top 12. For this, the separating device 40 comprises a separating wall 42 which can be displaced around an axis A, which extends in the horizontal direction, between a horizontal cargo space enlarging position (FIG. 1) and a vertical receiving space enlarging position (FIG. 2). At its edge facing away from the pivotal axis A, a tarp 44, which can be made of a resilient material and can thus be stable in form in its corresponding position, is connected to the separating wall 42. Alternatively thereto, spring elements or rather leaf springs can be integrated into the tarp 44 so as to keep the shape of the tarp 44. An edge 42 of the tarp 44 facing away from the separating wall 42 is connected to a bottom 46 of the top receiving space 20.

In order to be able to displace the separating wall 42 in conjunction with the tarp 44, a coupling device 48 realized as a bowden pull is fastened to the separating wall 42, said coupling device 48 being connected to the tensioning bow 32 or rather the kinematics of the same in the area of the main bearing 28 by its end facing away from the separating wall 42. Via the coupling device 48, the separating wall 42 can thus be pivoted from the horizontal storage space enlarging position to the receiving space enlarging position illustrated in FIG. 2 when the tensioning bow 32 is pivoted from the tensioning position, in which it rests on the top receiving space lid 34, to a lifting position (FIG. 2). The separating wall 42 then forms the rearward limit of the top receiving space 20 and the tarp 44 forms the limit on the bottom side of the top receiving space 20 adjacent to the top compartment bottom 46.

The coupling device 48 comprises two pull cables, one of which pulls the separating wall 42 into the cargo space enlarging position when the tensioning bow kinematics is accordingly actuated and the other of which pulls the separating wall 42 into the storage space enlarging position when the tensioning bow kinematics is accordingly actuated.

LIST OF REFERENCES 10 vehicle
12 top
14 top cover
16 top linkage
18 vehicle interior
20 top receiving space
22 link arrangement
24 main link
26 main link
28 main bearing
30 main drive
32 tensioning bow
34 top receiving space lid
36 storage space
38 cargo space
40 separating device
42 separating wall
44 tarp
46 bottom
48 coupling device

The invention claimed is:

1. A separating device for a storage space of a convertible vehicle having a top which can be displaced between a closed position spanning a vehicle interior and a storage position opening the vehicle interior upward, the separating device comprising: a separating wall, which divides the storage space into a cargo space and a top receiving space and which can be pivoted around a pivotal axis (A), which extends in the transverse direction of the vehicle, between a horizontal cargo space enlarging position and a vertical receiving space enlarging position, wherein the separating wall is connected to a coupling device, which transmits a displacement movement of a top element to a pivotal movement of the separating wall.

2. The separating device according to claim 1, wherein the coupling device comprises at least one pull cable arrangement, at least one tension-resistant and pressure-resistant drive cable and at least one deviation lever.

3. The separating device according to claim 2, wherein the pull cable arrangement comprises two cable pulls, of which one pivots the separating wall into the horizontal cargo space enlarging position by exerting a pull force when correspondingly actuated and the other pivots the separating wall into the vertical receiving space enlarging position by exerting a pull force when correspondingly actuated.

4. The separating device according to claim 1, wherein the separating wall is pre-tensioned towards the cargo space enlarging position or towards the receiving space enlarging position by means of a spring.

5. The separating device according to claim 1, wherein the top element is a kinematic element for displacing a rearward tensioning bow of the top or a backlight shell of the top.

6. The separating device according to claim 1, wherein a tarp is fastened to an edge of the separating wall facing away from the pivotal axis (A) and is connected to a receiving space bottom by its edge facing away from the separating wall.

7. The separating device according to claim 6, wherein the tarp is at least partially made of a resilient material so that the tarp is concavely curved in the cargo space enlarging position relative to the top receiving space.

8. The separating device according to claim 6, wherein the tarp is convexly curved in the receiving space enlarging position relative to the top receiving space.

9. The separating device according to claim 1, wherein a securing device is provided which decouples the separating wall from a top kinematics upon identifying an obstacle in the trajectory of the separating wall.

10. The separating device according to claim 1, further comprising a collision sensor which is connected to a top control.

11. A convertible vehicle, comprising: a top which can be displaced between a closed position spanning a vehicle interior and a storage position opening the vehicle interior upward, and a storage space as well as a separating device according to claim 1.

12. The separating device according to claim 1, wherein the coupling device comprises at least one pull cable arrangement, and at least one deviation lever.

* * * * *